May 28, 1963   H. P. DILLON II   3,091,548
HIGH TEMPERATURE COATINGS
Filed Dec. 15, 1959
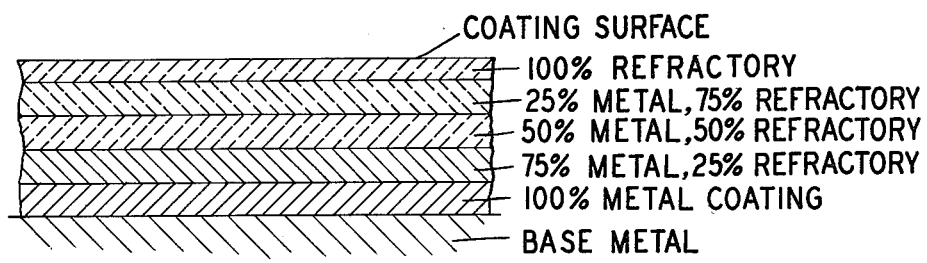
INVENTOR.
HARALD P. DILLON II
BY Richard S. Shreve Jr.
ATTORNEY United States Patent Office 3,091,548
Patented May 28, 1963

3,091,548
HIGH TEMPERATURE COATINGS
Harold Phillips Dillon II, Indianapolis, Ind., assignor to Union Carbide Corporation, a corporation of New York
Filed Dec. 15, 1959, Ser. No. 859,591
5 Claims. (Cl. 117—70)

This invention relates to high temperature refractory material coatings. More particularly it relates to refractory coatings having gradated metal content.

Refractory materials, such as alumina, are desirably used in industry as protective coatings for lower melting point base materials. Such coatings provide high temperature oxidation and corrosion protection. These refractory coatings are useful not only for their relatively high melting points but also because they often have thermal insulating properties. Alumina, for example, is useful for coating the after-burner sections of jet engines to protect the metal walls from damage by melting and oxidation. These refractory materials coated with prior art techniques have generally failed, however, by chipping and spalling due to the poor bond strength between the coating and the base plate and to the poor thermal shock resistance of the coating. Failure is also caused by differences in expansion coefficients between coating and base material. Attempts have also been made in the prior art to use a metal undercoat under a refractory coating. Most of these combinations have also been totally unsuccessful or have shown only limited success.

It is accordingly a primary object of the present invention to provide an improved refractory coating which would enable materials coated thereby to withstand severe high temperature operating conditions.

It is a further object to provide such a coating which will give an improved bond between the coating and the base material.

It is a still further object to provide such a coating which will help to overcome the deteriorating effects of high temperature thermal shock, spalling and differential expansion.

Other objects and advantages will be apparent from the specification and claims.

The objects of the invention are accomplished in general by a base material having a coating thereon which in a preferred form is substantially all metal adjacent the surface of the base material graduating to substantially all refractory material at the outer surface of the coating.

The drawing illustrates an article provided in accordance with the invention.

As stated previously, the present industrial environment necessitates constant research to continually develop materials capable of operating in the extreme high temperature ranges found in rocket engines, jet engines, nuclear power plants, etc. Certain refractory oxides such as alumina and zirconia are among the better refractory materials presently known. Previously coatings utilizing these as well as other refractory materials have had limited success due to thermal shock, spalling, chipping, differential expansion effects, etc.

The bond strength and the thermal shock resistance of refractory material coatings, especially of refractory oxides, can be improved according to the present invention by first coating a metal or metal alloy layer on the desired base material and then applying successive layers each containing varying proportional amounts of the undercoat metal or metal alloy and the desired refractory material. The outer layer preferably consists entirely of the refractory material in order to provide the maximum amount of protection to the base material from high temperature damage.

The metal undercoat is selected to provide a high bond strength to the base plate. The gradual change in metal content as the coating thickness increases maintains a fairly high bond strength throughout the entire coating. Since the metal usually has a higher heat conductivity than the refractory material, this metal content of the coating also tends to improve the resistance to spalling of the coating caused by thermal shock. One might assume that the ideal graduated coating would probably have a continuous variation in composition starting with all metal next to the base plate and ending with all refractory material on the outer surface. Such composite coating would consist of a plurality of infinitely thin layers having a minute change in composition between adjacent layers.

In the practice of the present invention it has been found necessary that the composite gradated coating consist of a minimum of three layers with each layer having a minimum thickness of about 0.0005 inch. The bond strength of the overall coating is not seriously affected if the composition in volume percent of each constituent in a given layer does not vary more than 50 volume percent from the composition in volume percent of the same constituent in an adjacent layer. A three layer, evenly gradated coating would have such a composition change. However, the change in constituent composition between any adjacent layers must not exceed 50 volume percent even in coatings having more than three layers. Excessive composition changes between adjacent layers tends to create areas of poor bond strength and may seriously weaken the coating. The preferred form of this invention utilizes at least five layers with a preferred maximum change in volume percent composition of each constituent between adjoining layers of about 25 volume percent. The following table illustrates the constituency (in volume percent) of a preferred embodiment of the invention.

|  | Metal, percent | Refractory Material, percent |
| --- | --- | --- |
| 1st layer (adjacent base) | 100 | 0 |
| 2nd layer | 75 | 25 |
| 3rd layer | 50 | 50 |
| 4th layer | 25 | 75 |
| 5th layer | 0 | 100 |

The unusal practice of this invention is to consecutively gradate the composition from the metal next to the base plate out to a refractory material on the outer surface. Such outer refractory layer can also be any desired thickness to give desired maximum results. It is understood, however, that modifications of the present invention include gradated coating of uniform layer thicknesses, uneven layer thicknesses, uniform composition variation between adjacent layers, uneven composition variation between adjacent layers as well as composite coatings containing several composition cycle changes from metal to refractory throughout the overall coating thickness.

The novel coatings of the present invention can be applied by any suitable coating process but are preferably applied with a high velocity, high temperature coating processes. Such methods are the detonation gun, jet plating, and arc torch coating processes described in U.S. Patents 2,714,563; 2,861,900; and applications S.N. 706,099 and S.N. 706,135, both of R. M. Gage et al., filed December 30, 1957.

The following examples describe the formation of several coating modifications of the present invention.

EXAMPLE I

*Gradated Chromium-Alumina Coating*

Detonation gun plating apparatus was used to produce this coating. Such apparatus was operated by feeding an oxygen-acetylene gas mixture at 5.5 c.f.m. into the elongated barrel of the plating apparatus, injecting suitable coating powder (Cr at —325 mesh and $Al_2O_3$ at —400 mesh) into the gas-filled barrel, igniting the gas mixture to produce a detonation, and impinging the powder on a baseplate to form a coating. Powder was only introduced prior to each ignition by means of a powder pulser. This operation cycle was repeated about 4 times per second. In order to produce a gradated coating consisting of several layers having varying composition, the coating conditions were often varied in order to obtain an adherent bond of the particular composition being used. Nitrogen dilution of the gas mixture was also frequently used to help the coating operation. When such nitrogen diluting is used to total oxygen-acetylene-nitrogen gas flow is maintained at 5.5 c.f.m. The following conditions were used to obtain a 0.0115 inch thick gradated chromium-alumina coating on steel wherein the volume percent content of each constituent in a given layer varied about 20 volume percent between adjacent layers of the coating. The different raw material powders were conveniently fed from separate powder dispensers at such rates as to produce the desired volume percent composition in the resulting coating.

| Layer | Gas mixture O/C atomic ratio | $N_2$ dilution of gas mixture, vol. percent | Coating passes | Powder feed rate, gms./min. | |
|---|---|---|---|---|---|
| | | | | Cr | $Al_2O_3$ |
| 1 | 1.0 | 20 | 4 | 30 | 0 |
| 2 | 1.0 | 20 | 4 | 30 | 7.5 |
| 3 | 1.0 | 20 | 4 | 25 | 16 |
| 4 | 1.0 | 0 | 4 | 15 | 23 |
| 5 | 1.2 | 0 | 4 | 5 | 23 |
| 6 | 1.4 | 0 | 4 | 0 | 23 |

EXAMPLE II

*Gradated Nickel-Alumina Coating*

Detonation gun apparatus was operated at 5.5 c.f.m oxygen-acetylene gas flow in similar fashion to that described in Example I to form a 0.0045 inch thick gradated nickel-alumina coating on a steel baseplate. The volume percent content of each constituent in the layers varied about 25 volume percent between adjacent layers of the coating. The following coating conditions were used.

| Layer | Gas mixture, O/C atomic ratio | $N_2$ dilution of gas mixture, vol. percent | Coating passes | Layer composition |
|---|---|---|---|---|
| 1 | 1.0 | 30 | 1 | Nickel. |
| 2 | 1.4 | 30 | 1 | Nickel-alumina. |
| 3 | 1.4 | 30 | 1 | Do. |
| 4 | 1.4 | 30 | 1 | Do. |
| 5 | 1.4 | 0 | 1 | Alumina. |

EXAMPLE III

*Gradated Nickel-Alumina Coating*

Detonation gun apparatus was operated at 5.5 c.f.m. oxygen-acetylene gas flow in similar fashion to that described in Example I. The following conditions were used to obtain a 0.030 inch thick gradated nickel-alumina coating on steel wherein the volume percent content of each constituent in the layers varied about 25 volume percent between adjacent layers of the coating. The particular coating conditions and alumina powder used (each alumina particle is an aggregate of several 4–15 micron dia. particles) resulted in a more porous coating than that of Example II.

| Layer | Gas mixture, O/C atomic ratio | $N_2$ dilution of gas mixture, vol. percent | Powder feed rate, gms./min. | | Coating passes | Layer thickness, inches |
|---|---|---|---|---|---|---|
| | | | Ni | $Al_2O_3$ | | |
| 1 | 1.0 | 40 | 32 | 0 | 10 | 0.0125 |
| 2 | 1.0 | 40 | 23.5 | 8 | 10 | 0.005 |
| 3 | 1.0 | 40 | 15.5 | 16 | 10 | 0.0025 |
| 4 | 1.0 | 40 | 8.0 | 24 | 10 | 0.002 |
| 5 | 1.04 | 0 | 0 | 32 | 10 | 0.008 |

EXAMPLE IV

*Gradated Nickel-Aluminum Silicate Coating*

Detonation gun apparatus was operated at 5.5 c.f.m. oxygen-acetylene gas flow in similar fashion to that described in Example I. The following conditions were used to obtain a 0.0055 inch thick gradated nickel-mullite ($3Al_2O_3 \cdot 2SiO_2$) coating on steel wherein the volume percent content of each constituent in the layers varied about 25 volume percent between adjacent layers of the coating. This example also gives representative data for a composite coating having evenly spaced layers.

| Layer | Gas mixture, O/C atomic ratio | $N_2$ dilution of gas mixture, vol. percent | Powder feed rate, gms./min. | | Coating passes | Layer thickness, inches |
|---|---|---|---|---|---|---|
| | | | Ni | Mullite | | |
| 1 | 1.0 | 40 | 32 | 0 | 2 | 0.0015 |
| 2 | 1.0 | 40 | 23.5 | 4 | 4 | 0.001 |
| 3 | 1.0 | 40 | 15.5 | 8 | 8 | 0.001 |
| 4 | 1.4 | 30 | 8 | 12 | 8 | 0.001 |
| 5 | 1.4 | 0 | 0 | 16 | 8 | 0.001 |

EXAMPLE V

*Gradated Chromium-Alumina Coating*

An arc of 200 amperes and 60 volts (D.C.S.P.) was maintained in an arc torch between a ⅛-in. dia. tungsten stick cathode and a water-cooled copper nozzle anode with a ⅛-in. dia. central passage. An argon stream of 150 c.f.h. passed along the cathode and out through the nozzle passage. A mixture of chromium and alumina powders (—325 mesh) suspended in a 150 c.f.h. argon stream passed through an arc and then out through the nozzle passage for subsequent impingement on a rotating ½-in. dia. brass tube baseplate. The powder feed rates of the two powders were varied as indicated below to form a 0.005 inch thick layered coating wherein the composition in volume percent of each constituent in the layers changed about 25 volume percent between adjacent layers.

| Layer | Powder feed rate, gms./min. | | Layer thickness, inches |
|---|---|---|---|
| | Cr | $Al_2O_3$ | |
| 1 | 20 | 0 | 0.001 |
| 2 | 15 | 5 | 0.001 |
| 3 | 10 | 10 | 0.001 |
| 4 | 5 | 15 | 0.001 |
| 5 | 0 | 20 | 0.001 |

EXAMPLE VI

*Gradated Nickel-Alumina Coating*

Detonation gun apparatus was operated at 5.5 c.f.m. oxy-acetylene gas flow in similar fashion to that described in Example I except that no powder pulser was used and the powder was continuously fed to the detonation gun barrel. The following conditions were used to obtain a 0.0345 inch thick gradated coating on stainless steel wherein the volume percent content of each constituent in the layers varied 50 volume percent between adjacent layers of the coating. The same porous alumina powder described in Example III was used.

| Layer | Gas mixture, O/C atomic ratio | N₂ dilution of gas mixture, vol. percent | Powder feed rate, gms./min. | | Coating passes | Layer thickness, inches |
|---|---|---|---|---|---|---|
| | | | Ni | Al₂O₃ | | |
| 1 | 1.0 | 30 | 32 | 0 | 5 | .007 |
| 2 | 1.0 | 20 | 15.5 | 16 | 10 | .0055 |
| 3 | 1.04 | 0 | 0 | 50 | 20 | .022 |

EXAMPLE VII

*Gradated Chromium-Nickel (20–80) Alloy with Mullite*

Detonation gun apparatus was operated at 5.5 c.f.m. oxygen acetylene gas flow in similar fashion to that described in Example I. The following conditions were used to obtain a 0.0055 inch thick coating on steel wherein the volume percent content of each constituent in the layers varied about 25 volume percent between adjacent layers of the coating. This example also gives representative data for a composite coating having evenly spaced layers.

| Layer | Gas mixture, O/C atomic ratio | N₂ dilution of gas mixture, vol. percent | Powder feed rate, gms./min. | | Coating passes | Layer thickness, inches |
|---|---|---|---|---|---|---|
| | | | Cr-Ni | Mullite | | |
| 1 | 1.2 | 40 | 29 | 0 | 4 | .0015 |
| 2 | 1.2 | 40 | 21 | 4 | 6 | .001 |
| 3 | 1.2 | 40 | 14 | 8 | 6 | .001 |
| 4 | 1.2 | 40 | 7 | 12 | 6 | .001 |
| 5 | 1.4 | 0 | 0 | 16 | 8 | .001 |

EXAMPLE VIII

*Gradated Chromium-Chromium Oxide Coating*

Detonation gun apparatus was operated at 5.5 c.f.m. oxy-acetylene gas flow in similar fashion to that described in Example I, except that only one powder dispensing apparatus was used to supply one powder stream during the coating processes. The following conditions were used to obtain a 0.0055 inch thick gradated chromium-chromia coating on steel. The oxidizing potential of the detonation mixture was increased for each succeeding layer so that the chromium oxide content gradually increased as the coating thickness increased.

| Layer | Gas Mixture, O/C atomic ratio | N₂ dilution of gas mixture, vol. percent | Cr powder feed rate, gms./min. | Coating passes | Layer thickness, inches |
|---|---|---|---|---|---|
| 1 | 1.0 | 20 | 30 | 4 | .001 |
| 2 | 1.2 | 20 | 30 | 5 | .001 |
| 3 | 1.5 | 0 | 30 | 10 | .001 |
| 4 | 1.8 | 0 | 30 | 8 | .001 |
| 5 | 2.0 | 0 | 30 | 8 | .0015 |

Similar coating conditions were found desirable to produce a similar gradated coating on Inco 702 base material.

EXAMPLE IX

*Gradated Nickel-Chromium Oxide Coating*

Detonation gun apparatus was operated at 5.5 c.f.m. oxygen-acetylene gas flow in similar fashion to that described in Example I. The following conditions were used to obtain a 0.007 inch thick coating on steel wherein the volume percent content of each constituent in the layers varied about 25 volume percent between adjacent layers of the coating. The oxidizing potential of the detonation mixture was increased in a manner similar to that of Example VIII. Therefore the chromium oxide content gradually increased as the coating thickness increased.

| Layer | Gas mixture, O/C atomic ratio | N₂ dilution of gas mixture, vol. percent | Powder feed rate, gms./min. | | Coating passes | Layer thickness, inches |
|---|---|---|---|---|---|---|
| | | | Ni | Cr | | |
| 1 | 1.0 | 40 | 31 | 0 | 4 | .002 |
| 2 | 1.2 | 40 | 23.5 | 6 | 4 | .002 |
| 3 | 1.5 | 40 | 15.5 | 12 | 4 | .001 |
| 4 | 1.8 | 40 | 8.0 | 18 | 6 | .001 |
| 5 | 2.0 | 0 | 0 | 24 | 8 | .001 |

Similar coating conditions were found desirable to produce a similar gradated coating on Inco 702 base material.

EXAMPLE X

*Gradated Molybdenum-Silicon-Boron Coating*

An arc of 210 amperes and 60 volts (D.C.S.P.) was maintained in an arc torch between a ⅛-in. dia. tungsten stick cathode and a water-cooled copper nozzle anode with a ⅛-in. dia. central passage. An argon stream of 150 c.f.h. passed along the cathode and out through the nozzle passage. Finely divided molybdenum and a mechanical mixture of 65 weight percent silicon-35 weight percent crystalline boron suspended in a 150 c.f.h. argon stream passed through the arc and then out through the nozzle passage for subsequent impingement on a molybdenum baseplate. The feed rates of the two powder streams were varied as indicated below to form a 0.005 in. thick layered coating wherein the volume percent composition of each constituent in the layers changed about 33 volume percent between adjacent layers.

| Layer | Powder feed rate grams/min. | |
|---|---|---|
| | Mo | Si-B |
| 1 | 15–18 | 0 |
| 2 | 11–12 | 4 |
| 3 | 6 | 6 |
| 4 | 0 | 10 |

EXAMPLE XI

*Gradated Molybdenum-Molybdenum-Disilicide Coating*

An arc of 200 amperes and 60 volts (D.C.S.P.) was maintained in an arc torch between a ⅛-in. dia. tungsten stick cathode and a water-cooled copper nozzle anode with a ⅛-in. dia. central passage. An argon stream of 150 c.f.h. passed along the cathode and out through the nozzle passage. A mixture of finely divided molybdenum and molybdenum disilicide powders suspended in a 150 c.f.h. argon stream passed through the arc and then out through the nozzle passage for subsequent impingement on a molybdenum baseplate. The feed rates of the two powder streams were varied as indicated below to form a 0.010 in. thick layered coating wherein the volume percent composition of each constituent in the layers changed about 33 volume percent between adjacent layers.

| Layer | Powder feed rate, grams/min. | |
|---|---|---|
| | Mo | MoSi₂ |
| 1 | 20 | 0 |
| 2 | 12 | 5 |
| 3 | 5 | 10 |
| 4 | 0 | 15 |

In order to obtain a qualitative comparison between the bond strength of prior art alumina coating and gradated metal-alumina coatings of the present invention, the following test was made. ⅛-inch thick steel samples ⅜-inch wide and 3 inches long were coated with a given thickness of alumina or gradated metal-alumina. The coated sample was then clamp-supported at each end and screw pressure was applied at the center of the sample to bend it and place the coating under tension. Each turn of the screw deflected the sample about 0.036 inch. The number of turns of the screw necessary to cause cracking of the coating and then chipping of the coating were determined for various samples. A sample coated with a prior art alumina layer 0.002 inch thick cracked after two turns of the screw and began to chip and flake off after three turns. A gradated coating consisting of five layers each 0.001 inch thick with a 25 volume percent composition change between layers showed cracking after three runs and chipping after four turns. This indicated somewhat improved bond strength. A gradated coating consisting of five layers each 0.002 inch thick with a 25 volume percent composition change between layers showed cracking after three turns but required nine turns for chipping. This increased resistance to chipping is due primarily to the increased thickness and this increased ductility of the inner metal-containing layers. It should be noted that as the outer alumina layer thickness is increased, even with a gradated coating, the amount of deflection required to cause cracking and chipping decreases. Therefore in applications requiring increased bond strength an even gradated coating with minimum outer refractory material layer thickness is preferable.

Use of the gradated coatings of the present invention also improves the resistance of alumina coatings to damage by thermal shock. A straight alumina coating on steel immediately spalls off when heated to about 2500° F. and then rapidly air-quenched. An alumina coating with a nickel undercoat likewise readily fails in thermal shock after only a short test using water quenching. A nickel-alumina gradated coating on the same baseplate consisting of five evenly gradated layers having total thickness of about 0.030 inch withstood four cycles of heating to about 2750° F. followed by rapid water quenching before the coating failed by spalling. A nickel-alumina gradated coating consisting of three layers having total thickness of 0.034 inch (0.006 inch nickel, 0.006 inch 50–50 volume percent nickel-alumina, 0.022 inch alumina) withstood five heating-quenching cycles before damage by chipping. As a further improvement a nickel-alumina gradated coating consisting of five layers having a total thickness of 0.032 inch (0.0025 inch nickel, 0.0025 inch 75–25 volume percent nickel-alumina, 0.0025 inch 50–50 volume percent nickel-alumina, 0.0025 inch 25–75 volume percent nickel-alumina, 0.022 inch alumina) withstood nine heating-quenching cycles before damage by chipping.

Additional thermal cycling tests were made wherein a coated sample was heated to 2200° F. in 1½ minutes and then cooled to 1100° F. in ½ minute. An Inco 702 baseplate 3 inches long, ½ inch wide and 0.066 inch thick was coated on all surfaces with a 5-layer nickel-alumina gradated coating about 0.003 inch thick. This sample was passed edgewise over a ribbon flame to heat it up and then withdrawn to air cool it. This sample withstood 100 such thermal cycles without coating failure. Similar coatings of nickel-mallite have withstood as many as 151 thermal cycles without coating failure. The molybdenum-silicon-boron gradated coating on a molybdenum baseplate mentioned in Example X above withstood 100 such thermal cycles without failure. A straight ungradated silicon-boron coating on molybdenum baseplate cracked and spalled off when cooled to room temperature following one such thermal cycling test.

Measurements of thermal drop across gradated and non-gradated coatings of approximately the same overall thickness have indicated that the presence of the metal phase increases the thermal conductivity of the coating. Thus, for applications requiring maximum thermal drop across the overall coating, one should use a minimum amount of gradation to obtain improved bond strength and a maximum practical outer refractory thickness for increased thermal insulation.

The coatings all were dense and lamellar in nature indicating good physical bonding of the first layer and the base material and of adjacent layers to each other.

The base materials susceptible of protection by the instant invention include lower melting point metals such as copper and the like, graphite, carbon and certain plastics. The metal used in the coating may be either a simple metal or a suitable alloy.

While the invention has been described with respect to certain embodiments of coating application methods and constituency, it is to be understood that the invention is not intended to be limited thereby.

What is claimed is:

1. An article of manufacture adapted for exposure to extreme high temperature oxidation, erosion and thermal shock which comprises a base material having a dense lamellar composite coating of metal and refractory material adherently bonded thereto, such composite coating consisting of at least five layers wherein the innermost layer next to the object contains the greatest volume percent of metal, the outermost layer contains the greatest volume percent of refractory material, and wherein the composition in volume percent of each constituent in a given layer does not vary more than 25 volume percent from the composition in volume percent of the same constituent in an adjacent layer.

2. An article of manufacture as claimed in claim 1, wherein the metal is selected from the class consisting of chromium, nickel, molybdenum and alloys thereof and the refractory material is selected from the class consisting of alumina, mullite, chromium oxide, molybdenum disilicide and 65–35 silicon-boron mixture.

3. An article of manufacture as claimed in claim 1, wherein the metal is chromium and the refractory metal is alumina.

4. An article of manufacture as claimed in claim 1, wherein each layer is at least 0.0005 inch in thickness.

5. A method for protecting a base material from the effects of higher temperature erosion, oxidation and thermal shock which comprises applying a first layer on the base material which is substantially all metal, applying at least three intermediate layers composed of metal and a refractory material, and applying an outer layer which is substantially all refractory material and proportioning the metal to refractory content of the intermediate layers such that the volume percent content of the components in a given layer does not vary more than 25 volume percent from the volume percent content of the same components in an adjacent layer.

References Cited in the file of this patent

UNITED STATES PATENTS

| | | |
|---|---|---|
| 2,707,157 | Stanton et al. | Apr. 26, 1955 |
| 2,858,235 | Rex | Oct. 28, 1958 |
| 2,861,010 | Axelrod et al. | Nov. 18, 1958 |
| 2,903,375 | Peras | Sept. 8, 1959 |

OTHER REFERENCES

Burns and Bradley: Protective Coatings for Metals, 2nd ed., Reinhold Pub. Corp., 1955, pages 592–595.